United States Patent
Arai et al.

(10) Patent No.: US 7,605,949 B2
(45) Date of Patent: Oct. 20, 2009

(54) IMAGE PROCESSING APPARATUS AND IMAGE PROCESSING METHOD ADAPTED TO CORRECT COLOR UNEVENNESS

(75) Inventors: Kazuhiko Arai, Kanagawa (JP); Junichi Ichikawa, Kanagawa (JP); Kenji Hara, Kanagawa (JP); Yasuyuki Tanaka, Kanagawa (JP); Yoshiya Imoto, Kanagawa (JP); Akira Ishii, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 691 days.

(21) Appl. No.: 11/353,029

(22) Filed: Feb. 14, 2006

(65) Prior Publication Data

US 2007/0064038 A1 Mar. 22, 2007

(30) Foreign Application Priority Data

Sep. 20, 2005 (JP) ............................. 2005-271783

(51) Int. Cl.
- G06K 15/00 (2006.01)
- H04N 1/405 (2006.01)
- H04N 1/46 (2006.01)

(52) U.S. Cl. ...................... 358/3.06; 358/3.2; 358/534; 358/536

(58) Field of Classification Search ............... 358/3.06, 358/3.2, 3.23, 406, 504, 534, 536
See application file for complete search history.

(56) References Cited

U.S. PATENT DOCUMENTS

| | | | |
|---|---|---|---|
| 5,457,541 A | * | 10/1995 | Burns ........................ 358/3.21 |
| 2002/0186415 A1 | * | 12/2002 | Condon et al. ............. 358/3.06 |
| 2004/0012817 A1 | * | 1/2004 | Brewington et al. ....... 358/3.06 |
| 2005/0213123 A1 | * | 9/2005 | Kobayashi .................. 358/1.9 |

FOREIGN PATENT DOCUMENTS

| JP | A 5-227396 | 9/1993 |
|---|---|---|
| JP | A 6-3911 | 1/1994 |

* cited by examiner

*Primary Examiner*—Thomas D Lee
(74) *Attorney, Agent, or Firm*—Oliff & Berridge, PLC (57) ABSTRACT

An image processing apparatus includes a storage unit that stores a correction amount used to correct color unevenness of an image according to a plurality of halftone screening conditions; and a correction unit that corrects an input image according to the correction amount stored in the storage unit. The stored correction amount includes common information, which is common among the halftone screening conditions, and dependent information, which is dependent on the respective halftone screening conditions.

16 Claims, 8 Drawing Sheets

IMAGE PROCESSING APPARATUS AND IMAGE PROCESSING METHOD ADAPTED TO CORRECT COLOR UNEVENNESS

BACKGROUND

1. Technical Field

The present invention relates to an image processing apparatus and method, which are adapted to correct color unevenness of an image.

2. Related Art

It is known that an image forming apparatus obtains density data indicating density unevenness caused in an image, which is formed on a recording medium, is obtained by reading the image, and that the image forming apparatus corrects the density unevenness caused in the image.

SUMMARY

According to an aspect of the present invention, there is provided an image processing apparatus including: a storage unit that stores a correction amount used to correct color unevenness of an image according to a plurality of halftone screening conditions; and a correction unit that corrects an input image according to the correction amount stored in the storage unit; wherein the stored correction amount includes common information, which is common among the halftone screening conditions, and dependent information, which is dependent on the respective halftone screening conditions.

According to another aspect of the invention, there is provided an image processing apparatus including: a detection unit that detects color unevenness of an image according to a plurality of halftone screening conditions; a correction amount calculation unit that calculates a correction amount corresponding to the color unevenness detected by the detection unit; a correction amount division unit that divides the correction amount into a common information which is common among the halftone screening conditions, and dependent information which is dependent on the respective halftone screening conditions; a storage unit that stores the common information and the dependent information; a correction unit that corrects the image according to the correction amount stored in the storage unit.

According to still another aspect of the invention, there is provided an image processing apparatus including: a print unit that prints an image on a recording medium according to a plurality of halftone screening conditions; a detection unit that detects color unevenness of the image printed by the print unit; a correction amount calculation unit that calculates a correction amount corresponding to color unevenness detected by the detection unit; a correction amount division unit that divides the correction amount calculated by the correction amount calculation unit into common information, which is common among the halftone screening conditions, and dependent information, which is dependent on the respective halftone screening conditions; a storage unit that stores the common information and the dependent information; and a control unit that controls the print unit to print the image based on the correction amount stored in the storage unit.

Further, according to a further aspect of the invention, there is provided an image processing method including: storing a correction amount used to correct color unevenness of an image according to a plurality of halftone screening conditions; and correcting an input image according to the stored correction amount; wherein the correction amount includes common information, which is common among the halftone screening conditions, and dependent information, which is dependent on the respective halftone screening conditions.

According to a still further aspect of the invention, there is provided an image processing apparatus comprising: a storage unit that stores a correction amount used to correct color unevenness of an image; and a correction unit that corrects an input image according to the correction amounts stored in the storage unit, wherein the correction amount includes a density correction amount which is common among a plurality of halftone screening conditions, the density correction amount corresponding to positions in a main scanning direction, and a density correction amount which is not common among the plurality of the halftone screening conditions.

BRIEF DESCRIPTION OF THE DRAWINGS

Embodiments of the present invention will be described in detail based on the following figures, wherein:

FIGS. 6A to 6D are graphs illustrating the tendencies of occurrence of color unevenness, which is generated in an image (the cyan image) by the image processing apparatus.

DETAILED DESCRIPTION

Next, an embodiment of the invention is described below with reference to the accompanying drawings.

Figure 1:
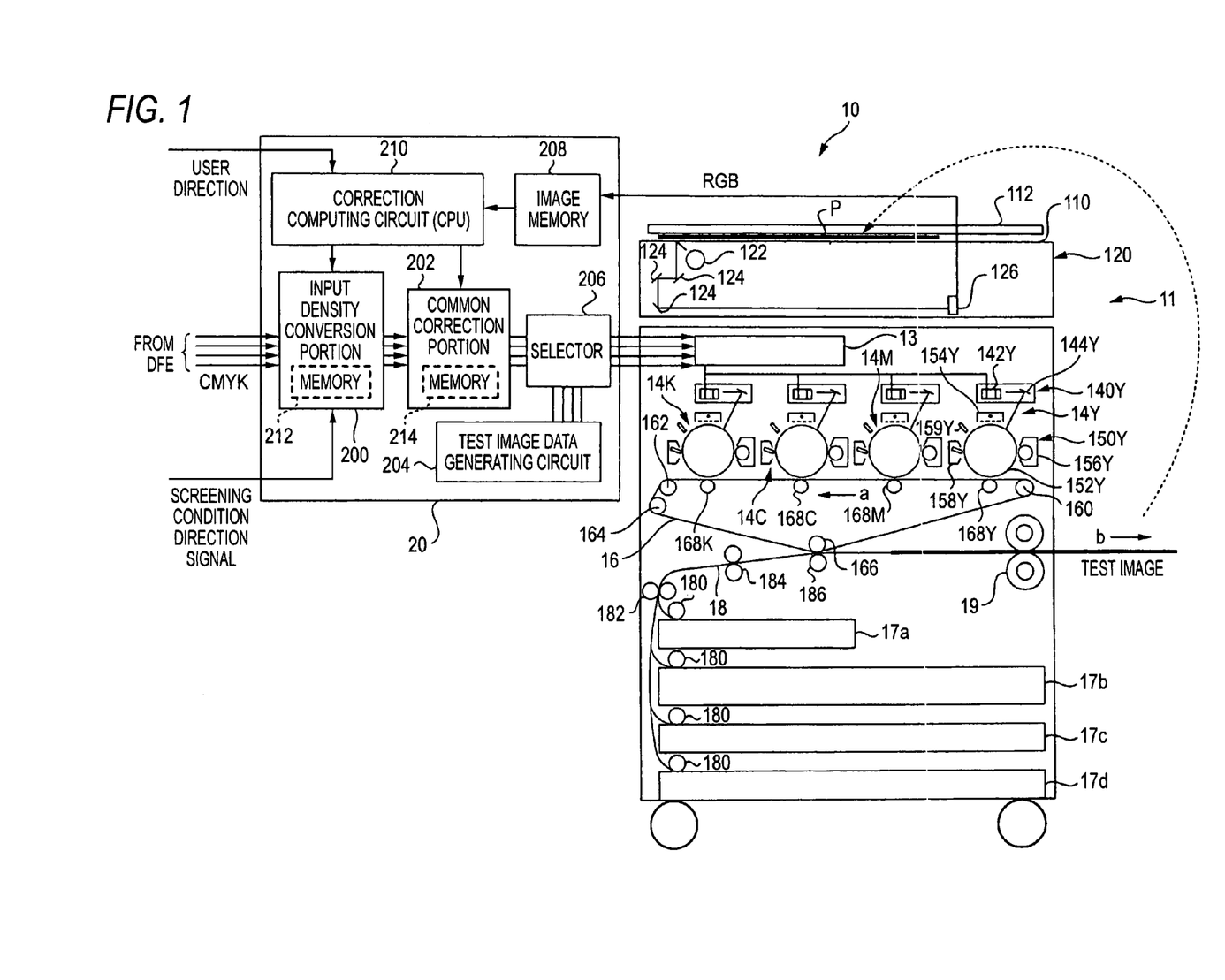
FIG. 1 is a side diagram illustrating an outline of an image processing apparatus according to an embodiment of the invention.

FIG. 1 shows an outline of an image processing apparatus 10 according to an embodiment of the invention. The image processing apparatus 10 includes an image reading unit 11, an exposure unit 13, a plurality of image forming units 14, an intermediate transfer belt 16, recording-medium trays 17a to 17d, a recording medium conveying path 18, a fixing unit 19, and a control portion 20. Imaged at a respectively corresponding to C (cyan), M (magenta), Y (yellow), and K (black) are obtained from a DFE (Digital Front End), such as a computer or a server, which is not shown, in response to a user's operation. Then, an image is printed on a recording medium, such as paper. Incidentally, the image processing apparatus 10 may include a terminal unit, such as a computer, connected through a network as a component of a system. The control portion 20 is disposed at a certain place in the system.

The image reading unit 11 is disposed at an upper part of the image processing apparatus 10. The image reading unit 11 is a scanner adapted to read an image by decomposing the image into R (red), G (green) and B (bluish purple) components. The image reading unit 11 reads, for example, a test image, which is printed by the image processing apparatus 10, and outputs R-, G-, and B-component image data of the test image to the control portion 20.

An exposure unit 13 is disposed under the image reading unit 11. The exposure unit 13 includes a light source (not shown) and lenses (not shown) and outputs modulated laser light beams, which respectively correspond to the colors Y, M, C, and K according to image data inputted from the control portion 20, to the plurality of image forming units 14 disposed under the exposure unit 13.

The plurality of image forming units 14 are disposed corresponding to the colors of a color image, respectively. In this embodiment, a first image forming unit 14Y, a second image forming unit 14M, a third image forming unit 14C, and a fourth image forming unit 14K respectively corresponding to yellow (Y), magenta (M), cyan (C), and black (K) are disposed at constant intervals along the intermediate transfer belt 16 in a horizontal direction. The intermediate transfer belt 16 serving as an intermediate transfer element is turned in the direction of an arrow a shown in the figure. The four image forming units 14Y, 14M, 14C, and 14K form toner images of the colors Y, M, C, and K according to image data inputted from the control portion 20 sequentially. Then, the image forming units 14Y, 14M, 14C, and 14K perform the (primary) transfer of the toner images to the intermediate transfer belt 16 so that plural toner images are overlapped with one another. The order of the colors respectively corresponding to the image forming units 14Y, 14M, 14C, and 14K is not limited to a certain order and is optional.

The recording medium conveying path 18 is disposed under the intermediate transfer belt 16. A recording medium supplied from one of the recording medium trays 17a to 17d is conveyed on the recording medium conveying path 18. Thus, the toner images respectively corresponding to the colors, which are multiply transferred onto the intermediate transfer belt 16, are collectively transferred (as a secondary transfer). The transferred toner images are fixed by the fixing unit 19. Then, the recording media having the fixed toner images are externally discharged along the direction of an arrow b.

Next, each of the components of the image processing apparatus 10 is described in more detail below.

The image reading unit 11 has a platen glass 11, on which an original P of, for instance, a test image is placed, a platen cover 112 adapted to press the original P against the platen glass 110, and an image reading portion 120 adapted to read an image, which is formed on the original P placed on the platen glass 110, by decomposing the image into three component images, that is, R-, G-, and B-component images. The image reading unit 11 outputs the components images which are read by decomposing to the control portion 20. The image reading portion 120 illuminates the original P, which is placed on the platen glass 110, with light from the light source 122. An image formed from reflection light reflected by the original P is scanned and exposed on an image reading element 126, which includes three CCDs, through a reduction optical system including a plurality of mirrors 124. The image formed on the original P is read by the image reading element 126 by being decomposed into three component images, that is, the R-, G-, and B-component images each having a predetermined dot density.

The first image forming unit 14Y, the second image forming unit 14M, the third image forming unit 14C, and the fourth image forming unit 14K are arranged in a horizontal direction at constant intervals in parallel with one another, and are substantially similarly constructed, except for the color of formed images. Thus, hereinafter, the first image forming unit 14Y is described by way of example. Incidentally, the components of the image forming units 14 are distinguished from one another by letters Y, M, C, and K included in reference characters that designate such components.

The image forming unit 14Y includes an optical scanning device 140Y and an image forming device 150Y.

The optical scanning device 140Y is configured to deflection-scan laser light corresponding to yellow (Y) inputted from the exposure unit 13 by using a rotating polygon mirror 142Y, and to irradiate the laser light onto a photoconductor drum 152Y of the image forming device 150Y.

The image forming device 150Y includes the photoconductor drum 152Y which rotates along the direction of an arrow a at a predetermined rotating speed and serves as an image bearing element, an electrification device 154Y adapted to uniformly electrify the surface of this photoconductor drum 152Y, a developing device 156Y adapted to develop an electrostatic latent image formed on the photoconductor drum 152Y, a cleaning device 158Y, and a neutralization device 159Y. The surface of the photoconductor drum 152Y is uniformly electrified by the electrification device 154Y. An electrostatic latent image is formed thereon by laser light irradiated by the optical scanning device 140Y. The electrostatic latent image formed on the photoconductor drum 152Y is developed by using yellow toner by a developer 156Y, and is then transfer onto the intermediate transfer belt 16. Incidentally, after the process of transferring the toner image, residual toner and paper powder adhering to the photoconductor drum 152Y are removed by the cleaning device 158Y. Also, electricity is removed from the photoconductor drum 152Y by the neutralization device 159Y.

Similarly, the other image forming units 14M, 14C, and 14K are adapted to form toner images of magenta (M), cyan (C) and black (K) and to transfer the formed toner images onto the image transfer belt 16.

The intermediate transfer belt 16 is laid around a drive roll 160, an idle roll 162, a steering roll 164, and a backup roll 166, with certain tension. The intermediate transfer belt 16 is circulation-driven in the direction of the arrow a at a predetermined speed by causing a drive motor (not shown) to rotation-drive the drive roll 160. This intermediate transfer belt 16 is formed like an endless belt by forming a flexible film made of a synthetic resin, such as polyamide, like a belt and by connecting both ends of this synthetic resin film, which is formed like a belt, to each other by welding.

Also, a first primary transfer roll 168Y, a second primary transfer roll 168M, a third primary transfer roll 168C, and a fourth primary transfer roll 168K are disposed on the intermediate transfer belt 16 at places facing the image forming units 14Y, 14M, 14C, and 14K, respectively. Toner images of the colors Y, M, C, and K respectively formed on the photoconductor drum 152Y, 152M, 152C, and 152K are multiply transferred on the intermediate transfer belt 16 by these primary transfer rolls 168.

Paper feeding rolls 180, which are used to take out recording media respectively from the recording medium trays 17a to 17d, and a recording-medium conveying roller pair 182, and resist rolls 184, which are used to convey a recording medium to a secondary transfer position with predetermined timing, are disposed on the recording medium conveying path 18.

Also, a secondary transfer roll 186 pressure-contacted with the backup roll 166 is disposed at the secondary transfer position on the recording medium conveying path 18. The toner images respectively corresponding to the colors multiply transferred onto the intermediate transfer belt 16 are transferred onto a recording medium by a secondary transfer utilizing a pressure-contacting force and an electrostatic force due to the secondary transfer roll 186. The recording medium onto which the toner images respectively corresponding to the colors are transferred is conveyed to the fixing unit 19.

The fixing unit 19 is adapted to fix toner onto a recording medium by applying heat and a pressure to the recording medium, onto which the toner images respectively corresponding to the colors are transferred.

The control portion 20 has an input density conversion portion 200, a common correction portion 202, a test image data generating circuit 204, a selector 206, an image memory 208, and a correction computing circuit 210.

The input density conversion portion 200 includes a memory 212 adapted to store a condition dependent correction table 30 (to be described later) corresponding to each of the colors. The input density conversion portion 200 obtains image data (representing input densities in terms of density values) respectively corresponding to the colors C, M, Y, and K from the DFE, such as a computer or a server (not shown). Also, the input density conversion portion 200 corrects the obtained input density corresponding to each of the colors C, M, Y, and K according to the condition dependent correction table 30 corresponding to each of the colors, which is received from the correction computing circuit 210, in response to a screening condition direction signal inputted through a user interface (UI), which is not shown. Subsequently, the input density conversion portion 200 outputs the corrected input density to the common correction portion 202.

Incidentally, information represented by the screening condition direction signal which is received by the input density conversion portion 200 includes information representing, for example, the number of screen lines, a screen angle, and the shapes of halftone dots. The following description of this embodiment describes a case where the screen angle is set at a constant value and the shape of the halftone dots is set to be a certain shape according to the information represented by the screening condition direction signal, and where a plurality of the numbers of screen lines are designated by the screening condition direction signal, by way of example.

The common correction portion 202 includes the memory 214 adapted to store the common density correction table 32 corresponding to each of the colors, which will be described later. The common correction portion 202 obtains the corrected input density from the input density conversion portion 200, and corrects the corrected input density obtained therefrom according to the common density correction table 32, which is received from the correction computing circuit 210 and corresponds to each of the colors C, M, Y, and K at each of dot positions arranged in a main scanning direction. Then, the common correction portion 202 outputs resultant corrected input densities to the selector 206.

The test image data generating circuit 204 generates test image data, which is used to form an uneven color correction test image corresponding to each of the colors C, M, Y, and K, and outputs the generated test image data to the selector 206.

The selector 206 is adapted to obtain setting-information indicating which of a mode (an ordinary print mode), in which an image is printed according to image data corresponding to each of the colors C, M, Y, and K obtained from the DFE, and a mode (a test mode), in which the color unevenness (color shading) of an image to be printed is corrected, is selected as an operation mode in which the image processing apparatus 10 operates, through, for example, a user interface (not shown). Thereafter, the selector 206 outputs image data, which is selected according to the obtained setting-information, to the exposure unit 13. That is, the selector 206 selects and outputs image data inputted from the common correction portion 202 in the case of obtaining the setting information indicating that the apparatus 10 operates in the ordinary print mode. However, the selector 206 selects and outputs image data inputted from the test image data generating circuit 204 in the case of obtaining the setting information indicating that the apparatus 10 operates in the test mode.

The image memory 208 is adapted to receive and store three component images (respectively represented by three pieces of image data), which are outputted by the image reading unit 11 and respectively correspond to the colors R, G, and B. The image memory 208 is also adapted to output the image data to the correction computing circuit 210 in response to an access made by the correction computing circuit 210.

The correction computing circuit 210 includes, for instance, a CPU, and is adapted to receive a user's direction through a user interface (not shown). Also, the correction computing circuit 210 is adapted to receive the images, which respectively correspond to the colors R, G, and B, and to detect color unevenness in each of the images respectively corresponding to the colors C, M, Y, and K, which is generated by the image processing apparatus 10, by detecting color unevenness in the obtained image. Incidentally, the corresponding relation between the density values of the images of the colors C, M, and Y and the density values of the images of the colors R, G, and B is set by preliminarily measuring the density values of the images of the colors R, G, and B, which correspond to those of known images of the colors C, M, and Y.

In a case where color unevenness is detected, the correction computing circuit 210 calculates correction amounts (density conversion amounts) used to correct the images, in each of which the color unevenness is detected, to prevent an occurrence of color unevenness. Then, the correction computing circuit 210 decomposes each of the correction amounts into a common correction amount, which is common among the plurality of halftone screening conditions, and a screening-condition-dependent correction amount which is used to correct the difference in color unevenness, which depends on the halftone screening conditions. Also, the correction computing circuit 210 generates the common density correction table 32, which is common among the plurality of halftone screening conditions, and the condition dependent correction table 30 that is used to correct the difference in color unevenness, which depends on the screen conditions, corresponding to each of the colors C, M, Y, and K. Subsequently, the correction computing circuit 210 outputs the condition dependent correction table 30 to the input density conversion portion 200, and also outputs the common density correction table 32 to the common correction portion 202.

Figure 2:
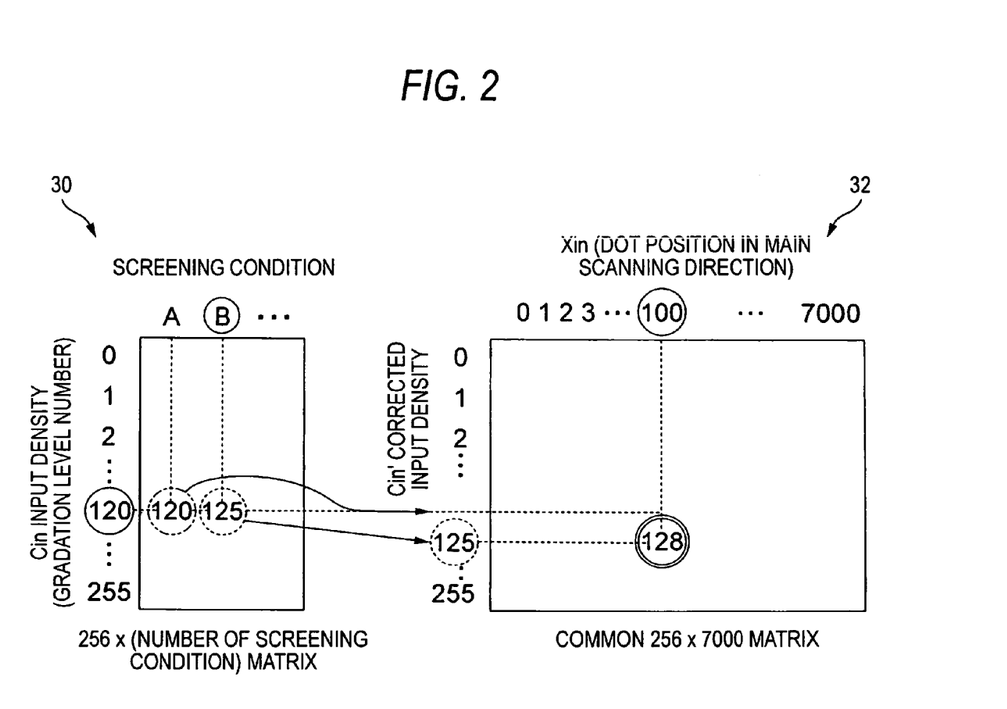
FIG. 2 is a diagram illustrating the configuration of each of a condition dependent correction table and a common density correction table corresponding to a cyan (C) image.

FIG. 2 is a diagram illustrating the configuration of each of the condition dependent correction table 30 and the common density correction table 32 corresponding to a cyan (C) image.

As illustrated in FIG. 2, the condition dependent correction table 30 corresponding to, for example, cyan (C) associates correction values of the input densities ($C_{in}$': corrected input densities), which correspond to each of the plurality of different halftone screening conditions, with the input densities $C_{in}$ (gradation level numbers ranging from 0 to 255) of the cyan (C) image to correct the difference in color unevenness, which depends on the halftone screening conditions. The screening condition A is that the number of screen lines is, for instance, 150. The screening condition B is that the number of screen lines is, for example, 600.

Thus, the condition dependent correction table 30 is represented by a matrix including correction values, the number of which is given by multiplying the number of gradation levels (256) by the number of halftone screening conditions, which can be printed by the image processing apparatus 10. Incidentally, the number of bits needed to designate the density of one dot (one pixel) is 8 (8 bits=1 byte). Therefore, in a case where the number of halftone screening conditions is 6, the capacity of the memory 212, which is necessary for storing the condition dependent correction table 30 corresponding to one of the colors C, M, Y, and K, is 1536 bytes (256×6×8 bits).

Also, as illustrated in FIG. 2, the common density correction table 32 corresponding to, for example, cyan (C) associates a correction value of each of the input densities, which is common among the plurality of halftone screening conditions, with the corrected input density $C_{in}$' (a gradation level number ranging from 0 to 255) of the cyan (C) image to correct the corrected input density at a dot position $X_{in}$ (ranging from 0 to 7000) located in the main scanning direction of the third image forming unit 14C.

Thus, the common density correction table 32 is represented by a matrix including correction values, the number of which is given by multiplying the number of gradation levels (256) by the number of dots in the main scanning direction of each of the image forming units 14. Because the number of bits needed to designate the density of one dot (pixel) is 8 (1 byte), the capacity of the memory 214, which is necessary for storing the common density correction table 32 corresponding to one of the colors C, M, Y, and K, is 1792 Kbytes (256×7000×8 bits).

Because the control portion 20 has the memory whose capacity is about 1.8 Mbytes, the control portion 20 can store the condition dependent correction table 30 and the common density correction table 32, which correspond to one of the colors C, M, Y, and K. Thus, as compared with a case where density correction values corresponding to each of the halftone screening conditions are stored (a memory, whose capacity is 256×7000×8×(the number of halftone screening conditions), is needed), the necessary capacity of the memory can be reduced.

Incidentally, to generate the condition dependent correction table 30 and the common density correction table 32, the image processing apparatus 10 prints test images respectively corresponding to the colors C, M, Y, and K one by one in response to a user's operation. The test images respectively corresponding to the colors C, M, Y, and K are set to have the same density in the main scanning direction to correct color unevenness occurring, for instance, in the main scanning direction. Also, the test images respectively corresponding to the colors C, M, Y, and K are set so that the density value (ranging from 0 to 255) increases in the sub-scanning direction. That is, the correction computing circuit 210 obtains image data, which respectively correspond to the colors R, G, and B and are read from the test images of the colors C, M, Y, and K, from the image memory 208. Then, the correction computing circuit 210 creates the condition dependent correction table 30 and the common density correction table 32 to correct color unevenness in the image represented by the image data corresponding to the colors C, M, Y, and K.

Next, a process of creating the condition dependent correction table 30 and the common density correction table 32, which are used to correct color unevenness, by the control portion 20 is described below.

Figure 3:
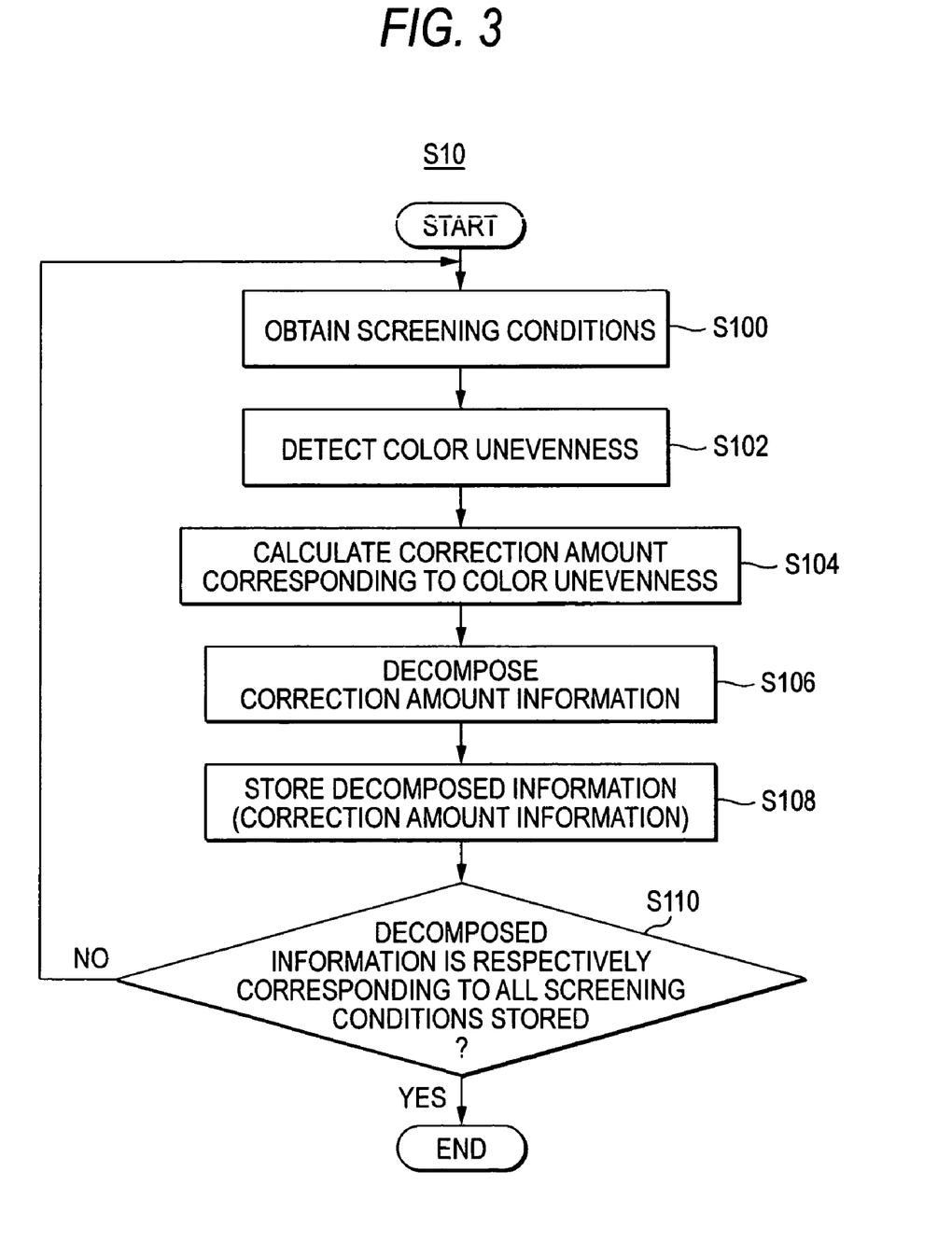
FIG. 3 is a flow chart illustrating a process S10 of a control portion that creates the condition dependent correction table and the common density correction table, which are used to correct color unevenness.

FIG. 3 is a flowchart illustrating a process S10 of the control portion 20 that creates the condition dependent correction table 30 and the common density correction table 32, which are used to correct color unevenness.

As illustrated in FIG. 3, in step 100 (S100), the correction computing circuit 210 receives the halftone screening conditions corresponding to the image data, which is received from the image memory 208, through the user interface (not shown).

In step 102 (S102), the correction computing circuit 210 obtains the image data from the image memory 208 and detects color unevenness (or color shading). For example, the correction computing circuit 210 detects color unevenness in each of density value patterns generated corresponding to each of the positions in the main scanning direction of each of the image forming units 14 so that the density value increases stepwise.

In step 104 (S104), the correction computing circuit 210 calculates a correction amount (a density conversion amount) used to correct the image, in which color unevenness is detected, to prevent an occurrence of color unevenness.

In step 106 (S106), the correction computing circuit 210 decomposes the calculated correction amount into a common density correction amount, which is common among the plurality of halftone screening conditions, and a condition dependent correction amount used to correct the difference in color unevenness, which depends on the halftone screening conditions. Thus, the correction computing circuit 210 creates the common density correction table 32, which is common among the plurality of halftone screening conditions, and the condition dependent correction table 30 used to correct the difference in color unevenness, which depends on each of the halftone screening conditions.

In step 108 (S108), the memory 212 stores the condition dependent correction table 30, while the memory 214 stores the common density correction table 32. Thus, the control portion 20 stores data (representing the correction amounts) decomposed by the correction computing circuit 210.

In step 110 (S110), the correction computing circuit 210 determines whether the image processing circuit 10 stores the correction amounts for all the corresponding halftone screening conditions in response to the user's direction received through the user interface (not shown). If the image processing circuit 10 does not store such correction amounts, the process proceeds to step S100. If the image processing circuit 10 stores such correction amounts, the process is finished.

Incidentally, the process S10 is performed on, for example, each of the test images respectively corresponding to the colors C, M, Y, and K.

Next, a process of correcting color unevenness in an image obtained from the DFE by the control portion 20 using the condition dependent correction table 30 and the common density correction table 32 is described below.

Figure 4:
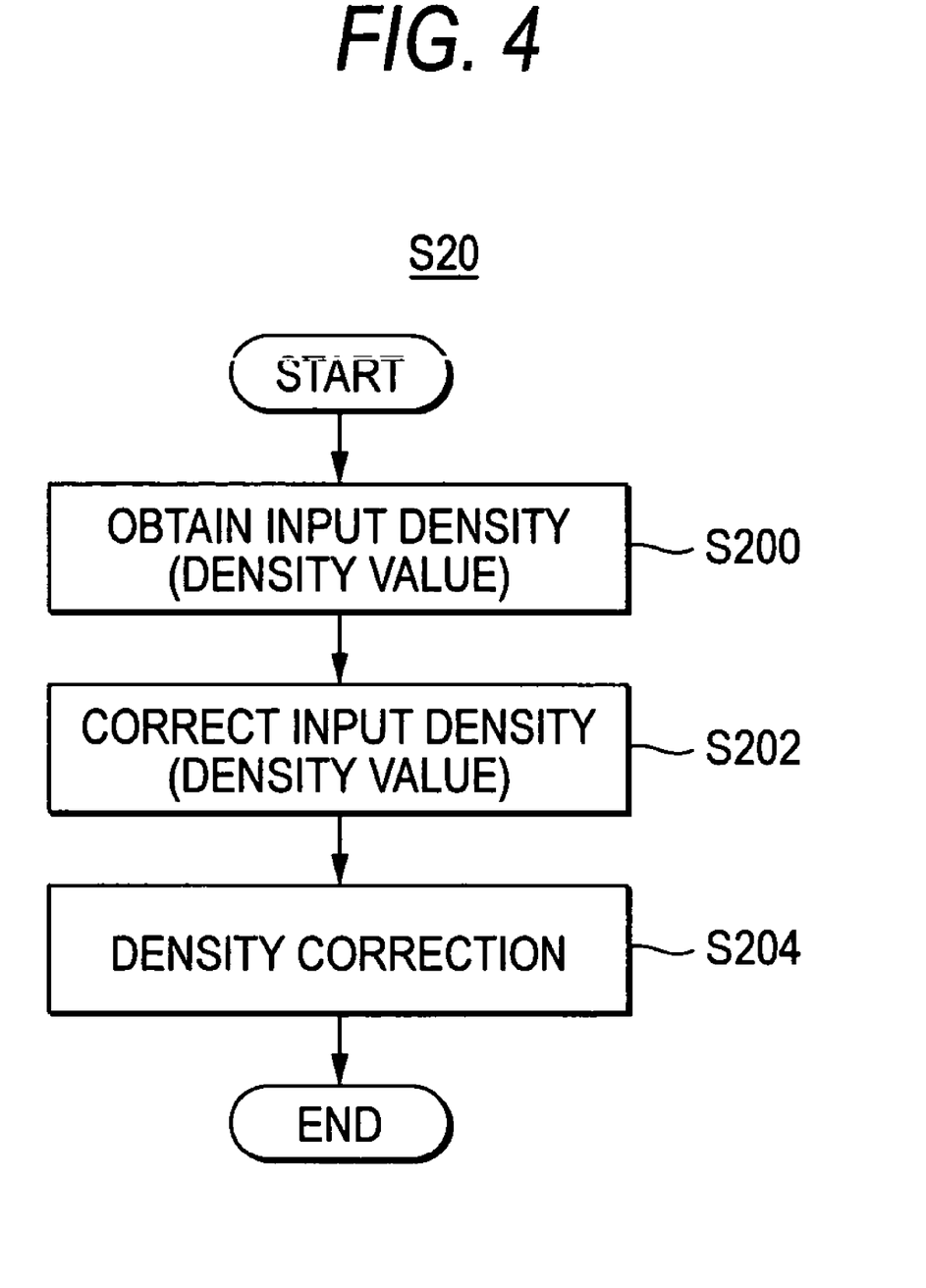
FIG. 4 is a flowchart illustrating a process S20 of the control portion that corrects color unevenness in an image obtained from a DFE according to the condition dependent correction table and the common density correction table.

FIG. 4 is a flowchart illustrating the process S20 of the control portion 20 that corrects color unevenness in an image obtained from the DFE according to the condition dependent correction table 30 and the common density correction table 32.

As illustrated in FIG. 4, in step 200 (S200), the input density conversion portion 200 obtains image data (representing the input densities indicated by density values) corresponding to the colors C, M, Y, and K.

For example, the input density conversion portion 200 obtains the input density $C_{in}$, whose density value is 120, corresponding to a dot, whose dot position $X_{in}$ in the main scanning direction is 100.

In step 202 (S202), the input density conversion portion 200 corrects the obtained input density corresponding to each of the colors C, M, Y, and K in response to the screening condition direction signal, which is inputted through the user interface (UI (not shown)), according to the condition dependent correction table 30 corresponding to each of the colors. Then, the input density conversion portion 200 outputs the corrected input densities to the common correction portion 202.

For example, as illustrated in FIG. 2, in a case where the screening condition inputted to the input density conversion portion 200 through the UI is the screening condition B (the number of screen lines is 600) and where the input density conversion portion 20 obtains the input density $C_{in}$ (the density value=120) corresponding to a dot, whose dot position $X_{in}$ in the main scanning direction is 100, the input density conversion portion 200 corrects the input density $C_{in}$ by changing the density value of 120 to a density value of 125 corresponding to the screening condition B. Then, the input density conversion portion 200 outputs the density value of 125 as the corrected input density $C_{in}'$ to the common correction portion 202.

Incidentally, in a case where the common density correction table 32 is created according to, for instance, the screening condition A, the input density $C_{in}$, that is, the density value of 120 is outputted to the common correction portion 202 as the corrected input density $C_{in}'$ without changing the density value according to the condition dependent correction table 30.

In step 203 (S204), the common correction portion 202 corrects the corrected input density corresponding to each of the colors C, M, Y, and K, which is obtained from the input density conversion portion 200, at each of dot positions in the main scanning direction of each of the image forming units 14 according to the common density correction table 32 corresponding to each of the colors. Then, the common correction portion 202 outputs resultant corrected input densities to the selector 206.

For instance, as illustrated in FIG. 2, in a case where the common correction portion 202 obtains the corrected input density $C_{in}'$, whose density value is 125, corresponding to the dot position in the main scanning direction $X_{in}=100$, the common correction portion 202 corrects the density value of the corrected input density $C_{in}'$ to a density value of 128 corresponding to the position $X_{in}=100$. Then, the common correction portion 202 outputs the density value of 128 to the selector 206.

Next, a modification of the control 20 is described below.

Figure 5:
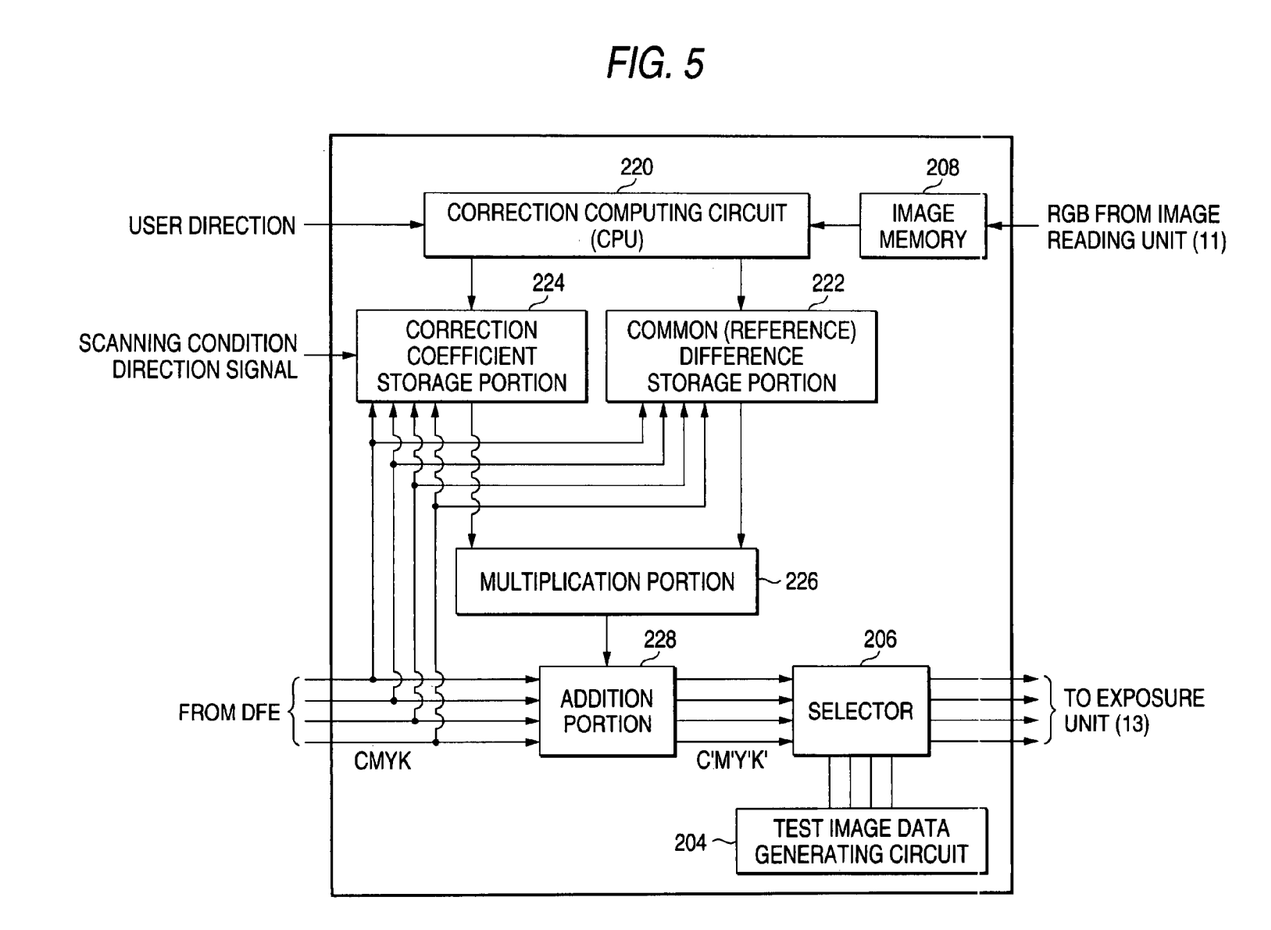
FIG. 5 is a diagram illustrating the configuration of a modification of the control portion.

FIG. 5 is a diagram illustrating the configuration of a modification (a control portion 20') of the control portion 20.

As illustrated in FIG. 5, the control portion 20' includes a correction computing circuit 220, a common (reference) difference storage portion 222, a correction coefficient storage portion 224, a multiplication portion 226, an addition portion (a correction processing portion) 228, a test data generating circuit 204, a selector 206, and an image memory 208.

Incidentally, components of the control portion 20' shown in FIG. 5, which are the substantially same as the components of the control portion 20 shown in FIG. 1, are designated by the same reference characters as those used to designate the substantially same components of the control portion 20.

The correction computing circuit 220 includes, for example, a CPU, and is adapted to receive a user's direction through a user interface (not shown). Also, the correction computing circuit 220 is adapted to receive the images, which respectively correspond to the colors R, G, and B, and to detect color unevenness in each of the images respectively corresponding to the colors C, M, Y, and K, which is generated by the image processing apparatus 10, by detecting color unevenness in the obtained image. Incidentally, the corresponding relation between the density values of the images of the colors C, M, and Y and the density values of the images of the colors R, G, and B is set by preliminarily measuring the density values of the images of the colors R, G, and B, which correspond to those of known images of the colors C, M, and Y.

Further, in a case where color unevenness is detected, the correction computing circuit 220 calculates correction amounts (density conversion amounts) used to correct the images, in each of which the color unevenness is detected, to prevent an occurrence of color unevenness. Then, the correction computing circuit 220 decomposes each of the calculated correction amounts according to the tendencies of occurrence of color unevenness (to be described later) into a density difference corresponding to a predetermined density, which is common among the plurality of halftone screening conditions, and a screening-condition-dependent correction coefficient which is used to correct the difference in color unevenness, which depends on the halftone screening conditions. Also, the correction computing circuit 220 generates a common (reference) density difference table 34, which is common among the plurality of halftone screening conditions, and a correction coefficient table 36 that is used to correct the difference in color unevenness, which depends on the screen conditions, corresponding to each of the four kinds of colors C, M, Y, and K.

Figure 6A:
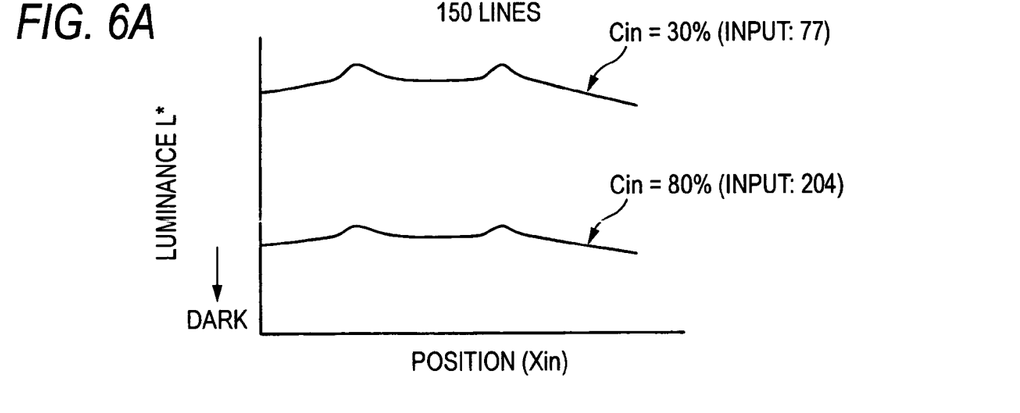
FIG. 6A is a graph illustrating a case where images are respectively formed at different densities $C_{in}$ of 30% and 80% by screening using 150 screen lines.
Figure 6B:
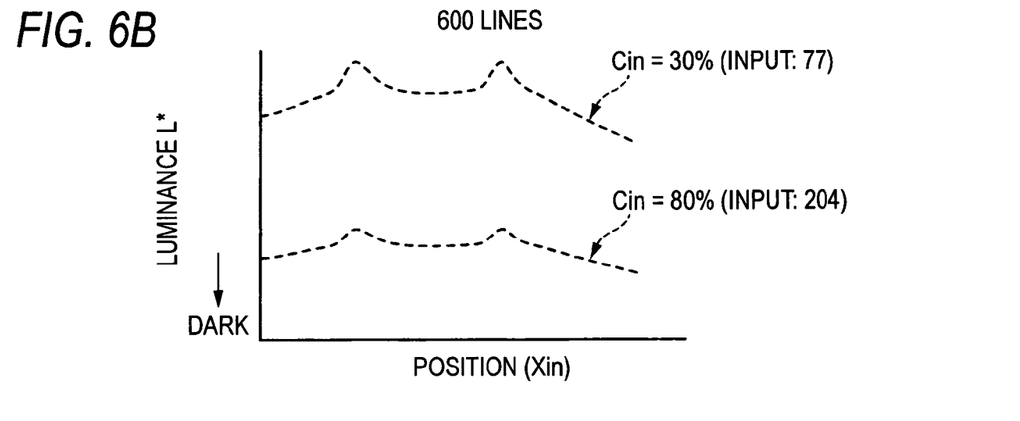
FIG. 6B is a graph illustrating a case where images are respectively formed at the different densities by the screening using 600 screen lines.
Figure 6C:
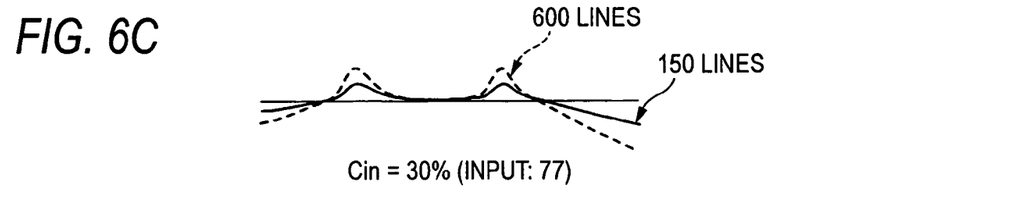
FIG. 6C is a graph illustrating a case where images are respectively formed at the same density by the screening using 600 screen lines and 150 screen lines.
Figure 6D:
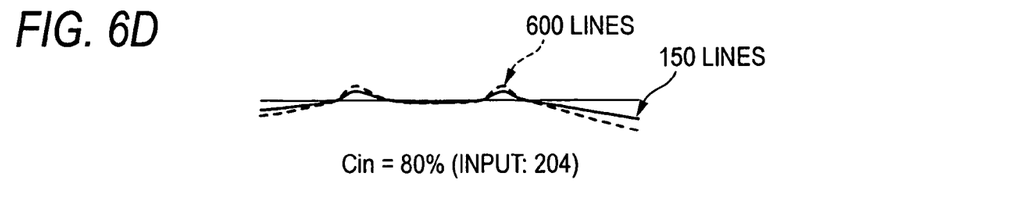
FIG. 6D is a graph illustrating a case where images are respectively formed at the same density, which is higher than the density used in the case illustrated in FIG. 6C (the luminance used in the case illustrated in FIG. 6D is lower than that used in the case illustrated in FIG. 6C), by the screening using 600 screen lines and 150 screen lines.

FIGS. 6A to 6D are graphs illustrating the tendencies of occurrence of color unevenness, which is generated in an image (the cyan image) by the image processing apparatus 10. FIG. 6A is a graph illustrating a case where images are respectively formed at different densities $C_{in}$ of 30% and 80% by screening using 150 screen lines. FIG. 6B is a graph illustrating a case where images are respectively formed at the different densities by the screening using 600 screen lines. FIG. 6C is a graph illustrating a case where images are respectively formed at the same density by the screening using 600 screen lines and 150 screen lines. FIG. 6D is a graph illustrating a case where images are respectively formed at the same density, which is higher than the density used in the case illustrated in FIG. 6C (the luminance used in the case illustrated in FIG. 6D is darker (or lower) than that used in the case illustrated in FIG. 6C), by the screening using 600 screen lines and 150 screen lines.

As shown in FIGS. 6A to 6D, an image, whose $C_{in}=30\%$ (an input density value=77), has a tendency that the difference in density, which corresponds to a difference in the position in the main scanning direction $X_{in}$, is larger than the difference in density, which corresponds to the same difference in the position in the main scanning direction $X_{in}$, in an image whose $C_{in}=80\%$ (an input density value=204). That is, the lower the density of the image, the larger the magnitude of the unevenness in color in the image. Also, an image outputted by setting the number of screen lines at 600 has a tendency that the difference in density, which corresponds to a difference in the position in the main scanning direction $X_{in}$, is larger than the difference in density, which corresponds to the same difference in the position in the main scanning direction $X_{in}$, in an image outputted by setting the number of screen lines at 150. That is, the larger the number of screen lines, the larger the magnitude of the unevenness in color in the image.

Incidentally, the frequency of occurrence of color unevenness in an image varies according to the halftone screening conditions and to the input density of the image. However, it is seen from these graphs that color unevenness frequently occurs at the substantially same position in the main scanning direction $X_{in}$. Thus, the correction computing circuit 220 can divide the correction amount for color unevenness into a density difference corresponding to a predetermined density, which is common among the plurality of halftone screening conditions, and a correction coefficient used to correct a color unevenness difference, which depends on the halftone screening conditions.

Then, the correction computing circuit 220 (see FIG. 5) generates the common difference table 34 and the correction coefficient table 36. Subsequently, the correction computing circuit 220 outputs the common difference table 34 to the common difference storage portion 222, and also outputs the correction coefficient table 36 to the correction coefficient storage portion 224.

The common difference storage portion 222 receives the common difference table 34 corresponding to each of images of the colors C, M, Y, and K from the correction computing circuit 220 and stores the received common difference table 34. Also, the common difference storage portion 222 obtains a density difference corresponding to the predetermined density of each of the images of the colors C, M, Y, and K, which are inputted from the DFE, according to the common difference table 34 and then outputs the obtained density difference.

The correction coefficient storage portion 224 receives the correction coefficient table 36, which shows a coefficient corresponding to the common difference table 34 used to correct the color unevenness difference depending on the halftone screening conditions, from the correction computing circuit 220 and stores the received correction coefficient table 36. Then, the correction coefficient storage portion 224 outputs a coefficient, which corresponds to the common difference table 34 used to correct the color unevenness difference depending on the halftone screening conditions, to the multiplication portion 226 according to the screening condition direction signal inputted from the user interface (not shown) and to the input density of each of the images of the colors C, M, Y, and K inputted from the DFE.

The multiplication portion 226 receives the density difference, which corresponds to the input density of each of the input densities of the images of the colors C, M, Y, and K, from the common difference storage portion 222 and also receives the coefficient from the correction coefficient storage portion 224. Then, the multiplication portion 226 multiplies the received difference by the received coefficient corresponding to each of the dot positions in the main scanning direction of each of the images of the colors C, M, Y, and K, and outputs a result of the multiplication as the correction amount to the addition portion 228.

The addition portion 228 receives the images of the colors C, M, Y, and K inputted from the DFE and then adds the correction amount, which is inputted from the multiplication portion 226, to the input density of each of the received images to thereby correct each of the images. Then, the addition portion 228 outputs the corrected image to the selector 206.

Next, a process of correcting color unevenness of the image obtained from the DFE by the control portion 20' according to the common difference table 34 and the correction coefficient table 36 is described below.

Figure 7:
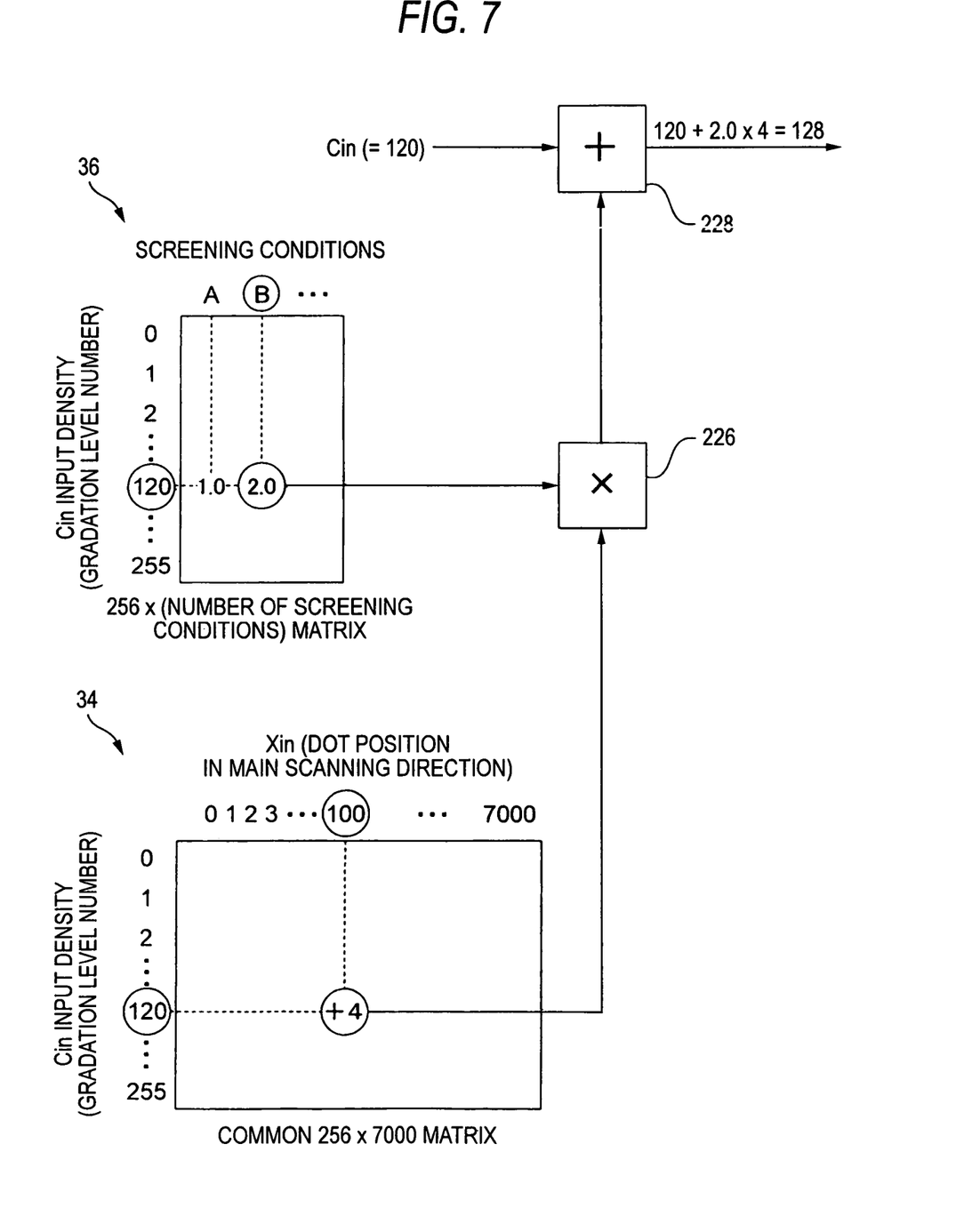
FIG. 7 is a conceptual diagram illustrating an operation of a modification of the control portion that corrects image data representing the cyan (C) image.

FIG. 7 is a conceptual diagram illustrating a process of a modification of the control portion 201 that corrects image data representing the cyan (C) image (the image data).

The common (reference) difference table 34 associates the difference corresponding to the predetermined reference density, which is common among the plurality of halftone screening conditions, with each of the input density $C_{in}$ (ranging from 0 to 255) of the cyan (C) image corresponding to the dot position $X_{in}$ (ranging from 0 to 7000) in the main scanning direction of the third image forming unit 14C.

Thus, the common difference table 34 is represented by a matrix including values, which represent differences of the number obtained by multiplying the number of gradation levels (256) by the number of dots (7000) in the main scanning direction of each of the image forming units 14. Incidentally, the number of bits required to indicate the difference corresponding to one dot is several bits (for example, 4 bits) even when including a sign bit. Therefore, the capacity of the common difference storage portion 222, which is necessary for storing the common difference table 34 corresponding to one of the colors C, M, Y, and K, is less than that capacity needed for storing the common density correction table 32 shown in FIG. 2, regardless of the number of halftone screening conditions.

The correction coefficient table 36 associates the coefficient, which corresponds to the common difference table 34 used to correct the color unevenness difference corresponding to each of the halftone screening conditions, with the input density $C_{in}$ of the image corresponding to each of the plurality of different halftone screening conditions. The screening condition A is that the number of screen lines is, for instance, 150. The screening condition B is that the number of screen lines is, for example, 600.

Thus, the condition dependent correction table 30 is represented by a matrix including the coefficients, the number of which is given by multiplying the number of gradation levels (256) by the number of halftone screening conditions, which can be printed by the image processing apparatus 10. Incidentally, the number of bits needed to designate the coefficient corresponding to one dot is less than 8. Therefore, the capacity of the correction coefficient storage portion 224, which is necessary for storing the correction coefficient table 36 corresponding to one of the colors C, M, Y, and K, varies according to the number of halftone screening conditions and can be made to be less than the capacity needed for storing the common density correction table 32 shown in FIG. 2.

For example, in a case where the screening condition inputted to the multiplication portion 226 through the user interface (not shown) is the screening condition B (the number of screen lines is 600) and where the control portion 20' obtains the input density $C_{in}$ (the density value=120) corresponding to a dot, whose dot position $X_{in}$ in the main scanning direction is 100, the multiplication portion 226 receives (+4) from the common difference table 34 as the difference value, and also receives a coefficient of 2.0 from the correction coefficient table 36 of the correction coefficient storage portion 224. Then, the multiplication portion 226 calculates a correction amount of (+8) by multiplying the difference (+4) by the coefficient (2.0). Subsequently, the multiplication portion 226 outputs the correction amount to the addition portion 228.

The addition portion 228 calculates the corrected density value 128 (=120+2.0×4) by receiving and adding the input density $C_{in}$, whose density value is 120, and the correction amount (+8). Then, the addition portion 228 outputs the corrected density value to the selector 206.

Figure 8:
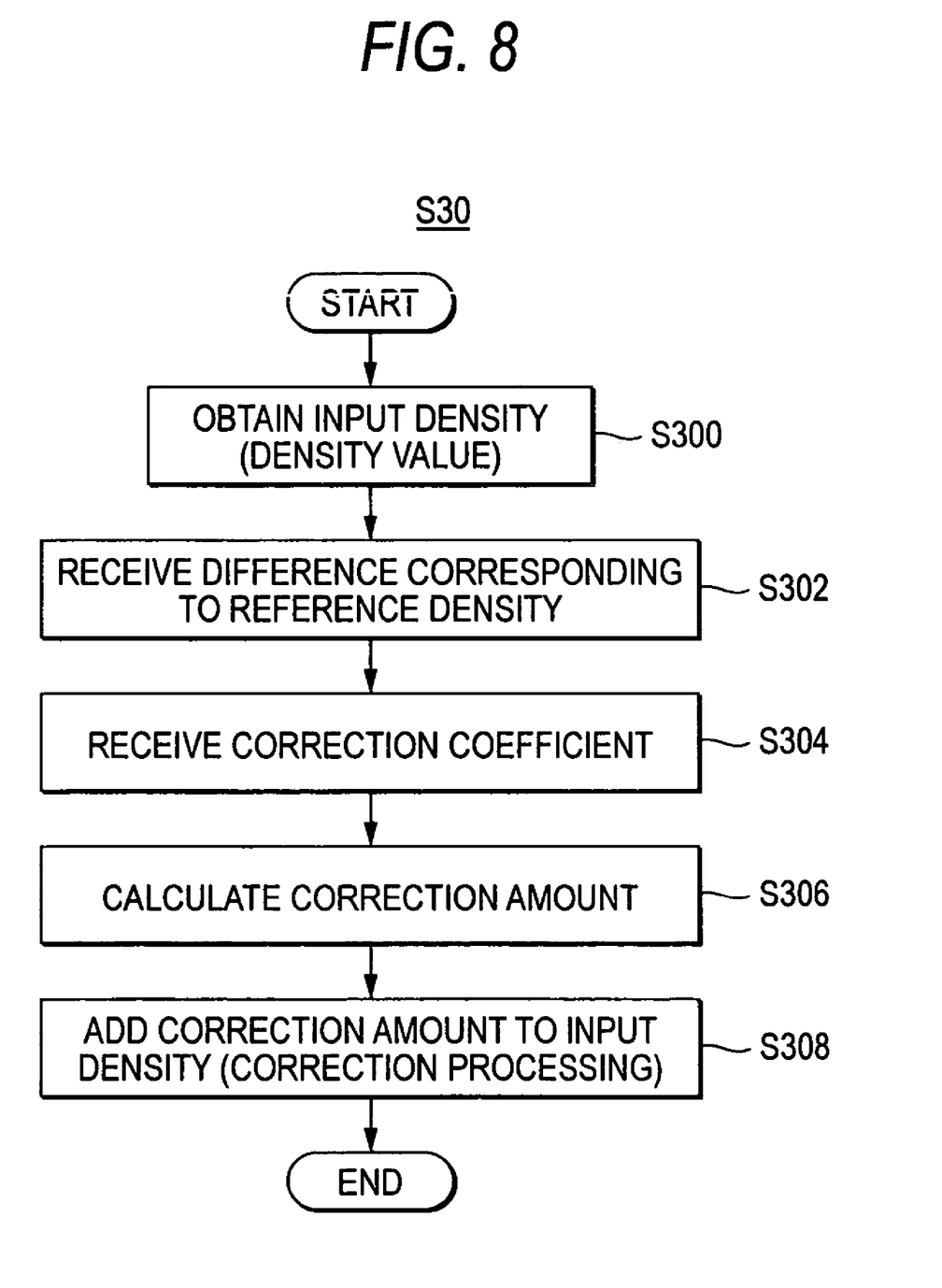
FIG. 8 is a flowchart illustrating a process S30 of the control portion that corrects color unevenness in an image obtained from the DFE according to a common difference table and a correction coefficient table.

FIG. 8 is a flowchart illustrating a process S30 of the control portion 20' that corrects color unevenness in an image obtained from the DFE according to the common difference table 34 and the correction coefficient table 36.

As illustrated in FIG. 8, in step 300 (S300), the common difference storage portion 222, the correction coefficient storage portion 224, and the addition portion 228 obtain image data (representing the input density in terms of the density value) corresponding to each of the colors C, M, Y, and K from the DFE.

For example, in a case where the screening condition inputted through the user interface (not shown) is the screening condition B (the number of screen lines is 600), the common difference storage portion 222, the correction coefficient storage portion 224, and the addition portion 228 obtain the input density $C_{in}$, whose density value is 120, corresponding to a dot whose dot position in the main scanning direction $X_{in}$ is 100.

In step 302 (S302), the multiplication portion 226 receives the difference value from the common difference table 34 of the common difference storage portion 222. For instance, the multiplication portion 226 receives a value of (+4) as the value of the difference, as illustrated in FIG. 7.

In step 304 (S304), the multiplication portion 226 receives the correction coefficient table 36 of the correction coefficient storage portion 224. For instance, the multiplication portion 226 receives a value of 20 as the coefficient, as illustrated in FIG. 7.

In step 306 (S306), the multiplication portion 226 calculates a correction amount by multiplying the received difference value by the received coefficient. For example, the multiplication portion 226 calculates a value of +8 as the correction amount.

In step 308 (S308), the addition portion 228 receives the correction amount and then adds the received correction amount to the input density to thereby calculate the corrected density value. For instance, the addition portion 228 receives a value of +8 as the correction amount, as illustrated in FIG. 7. Then, addition portion 228 adds the received correction amount to the input density $C_{in}$, whose density value is 120, to thereby calculate the corrected density value 128 (=120+2.0×4).

Incidentally, the tables (the common density correction table 32 and the common difference table 34), which are common among the plurality of halftone screening conditions serving as the reference of color unevenness correction, may be set corresponding to the most frequently used screening condition. Alternatively, these tables may be set corresponding to the condition (for example, the largest number of screening lines), under which color unevenness occurs most frequently.

Further, the foregoing description of the embodiment has described the case where the patterns are formed so that the test images have the same density in the main scanning direction, thereby to correct color unevenness in the main scanning direction, by way of example. However, the patterns according to the invention are not limited thereto and may be formed so that the test images have the same density in the sub-scanning direction, thereby to correct color unevenness in the sub-scanning direction.

Additionally, the foregoing description of the embodiment has described the case where the image reading unit 11 reads a test image by setting the test image on the image reading unit 11 by a user, by way of example. However, the invention is not limited thereto. For example, the reading unit may be provided in the apparatus to read a test image after the test image is fixed on a recording medium. Further, after the test image is read, the recording medium may be discharged from the image processing apparatus 10.

According to embodiments, the storage unit stores a correction amount corresponding to a density of an image. Therefore, even when the color unevenness varies according to the density of the image, the color unevenness can appropriately be corrected.

According to embodiments, the storage unit stores the correction amount by dividing information representing the correction amount into data representing a density correction table, which is common among the plurality of halftone screening conditions, and data representing a condition dependent correction table used to correct a color unevenness difference depending on the halftone screening conditions. That is, in a case where color unevenness is corrected according to the plurality of halftone screening conditions, the density correction table, which is common among the plurality of halftone screening conditions, can be shared. Thus, the capacity of a memory, which is needed for storing the table used to correct the color unevenness, can be reduced.

Also, it has been found that the frequency of occurrence of color unevenness in an image varies according to the halftone screening conditions and to the input density of the image, and that color unevenness frequently occurs at the substantially same position.

According to embodiments, the storage unit stores the correction amount by dividing data representing the correction amount into information representing a density correction table, which is common among the plurality of halftone screening conditions, and information representing a condition dependent correction table used to correct a color unevenness difference depending on the halftone screening conditions. Consequently, the difference table represents the density difference corresponding to the predetermined density. Thus, the number of bits needed for representing the density of one pixel (or dot) can be reduced. The capacity of a memory, which is necessary for storing the table used to correct the color unevenness, can be reduced.

According to embodiments, in a case where color unevenness is corrected according to a plurality of halftone screening conditions, the capacity of a memory used to store a table for correcting color unevenness can be reduced.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-271783 filed on Sep. 20, 2005 including specification, claims, drawings and abstract is incorporated herein be reference in its entirety.

FIG. 1
210 CORRECTION COMPUTING CIRCUIT (CPU)
208 IMAGE MEMORY

200 INPUT DENSITY CONVERSION PORTION
202 COMMON CORRECTION PORTION
206 SELECTOR
212 MEMORY
214 MEMORY
204 TEST IMAGE DATA GENERATING CIRCUIT
FIG. 3
S100 OBTAIN SCREENING CONDITIONS
S102 DETECT COLOR UNEVENNESS
S104 CALCULATE CORRECTION AMOUNT CORRESPONDING TO COLOR UNEVENNESS
S106 DECOMPOSE CORRECTION AMOUNT INFOPMATION
5108 STORE DECOMPOSED INFORMATION (CORRECTION AMOUNT INFORMATION)
S110 IS DECOMPOSED INFORMATION RESPECTIVELY CORRESPONDING TO ALL SCREENING CONDITIONS STORED?
FIG. 4
S200 OBTAIN INPUT DENSITY (DENSITY VALUE)
S202 CORRECT INPUT DENSITY (DENSITY VALUE)
S204 DENSITY CORRECTION
FIG. 5
220 CORRECTION COMPUTING CIRCUIT (CPU)
208 IMAGE MEMORY
224 CORRECTION COEFFICIENT STORAGE PORTION
222 COMMON (REFERENCE) DIFFERENCE STORAGE PORTION
226 MULTIPLICATION PORTION
228 ADDITION PORTION
206 SELECTOR
204 TEST IMAGE DATA GENERATING CIRCUIT
FIG. 8
S300 OBTAIN INPUT DENSITY (DENSITY VALUE)
3302 RECEIVE DIFFERENCE CORRESPONDING TO REFERENCE DENSITY
3304 RECEIVE CORRECTION COEFFICIENT
3306 CALCULATE CORRECTION AMOUNT
3308 ADD CORRECTION AMOUNT TO INPUT DENSITY (CORRECTION PROCESSING)

What is claimed is:

1. An image processing apparatus comprising:
a storage unit that stores a correction amount used to correct color unevenness of an image according to a plurality of halftone screening conditions; and
a correction unit that corrects an input image according to the correction amount stored in the storage unit;
wherein the stored correction amount comprises common information, which is common among the halftone screening conditions, and dependent information, which is dependent on the respective halftone screening conditions, and
wherein the common information corresponds to positions in a main scanning direction of the image processing apparatus.

2. The image processing apparatus according to claim 1, wherein the storage unit stores the correction amount according to a density of an image.

3. The image processing apparatus according to claim 1, wherein the storage unit stores a density correction table including the common information, and a condition dependent table including the dependent information used to correct color unevenness which is dependent on the respective halftone screening conditions.

4. The image processing apparatus according to claim 1, wherein the storage unit stores a density difference table including the common information which represents each density difference between a corresponding predetermined density and a corresponding corrected density, and a coefficient table including the dependent information, which represents each coefficient for the corresponding density difference and is used to correct the color unevenness which is dependent on the respective halftone screening conditions.

5. An image processing apparatus comprising:
a detection unit that detects color unevenness of an image according to a plurality of halftone screening conditions;
a correction amount calculation unit that calculates a correction amount corresponding to the color unevenness detected by the detection unit;
a correction amount division unit that divides the correction amount into common information which is common among the halftone screening conditions, and a dependent information which is dependent on the respective halftone screening conditions;
a storage unit that stores the common information and the dependent information;
a correction unit that corrects the image according to the correction amount stored in the storage unit.

6. The image processing apparatus according to claim 5, wherein the correction amount calculation unit calculates the correction amount according to a density of the image.

7. The image processing apparatus according to claim 5, wherein the correction amount division unit divides the correction amount into a density correction table including common information and a condition dependent table including the dependent information used to correct color unevenness which is dependent on the respective halftone screening conditions.

8. The image processing apparatus according to claim 5, wherein the correction amount division unit divides the correction amount into a density difference table including the common information which represents each density difference between a corresponding predetermined density and a corresponding corrected density, and a coefficient table including the dependent information, which represents each coefficient for the corresponding density difference and is used to correct the color unevenness which is dependent on the respective halftone screening conditions.

9. An image processing apparatus comprising:
a print unit that prints an image on a recording medium according to a plurality of halftone screening conditions;
a detection unit that detects color unevenness of the image printed by the print unit;
a correction amount calculation unit that calculates a correction amount corresponding to color unevenness detected by the detection unit;
a correction amount division unit that divides the correction amount calculated by the correction amount calculation unit into common information, which is common among the halftone screening conditions, and dependent information, which is dependent on the respective halftone screening conditions;
a storage unit that stores the common information and the dependent information; and
a control unit that controls the print unit to print the image based on the correction amount stored in the storage unit.

10. The image processing apparatus according to claim 9, wherein the correction amount calculation unit calculates the correction amount according to a density of the image.

11. The image processing apparatus according to claim 9, wherein the correction amount division unit divides the correction amount into a density correction table including common information and a condition dependent table including the dependent information used to correct color unevenness which is dependent on the respective halftone screening conditions.

12. The image processing apparatus according to claim 9, wherein the correction amount division unit divides the correction amount into a density difference table including the common information which represents each density difference between a corresponding predetermined density and a corresponding corrected density, and a coefficient table including the dependent information, which represents each coefficient for the corresponding density difference and is used to correct the color unevenness which is dependent on the respective halftone screening conditions.

13. An image processing method comprising:

storing a correction amount used to correct color unevenness of an image according to a plurality of halftone screening conditions; and correcting an input image according to the stored correction amount;

wherein the correction amount includes common information, which is common among the halftone screening conditions, and dependent information, which is dependent on the respective halftone screening conditions, and wherein the stored correction amount includes a density difference table including common information which represents each density difference between a corresponding predetermined density and a corresponding corrected density, and a coefficient table including the dependent information, which represents each coefficient for the corresponding density difference and is used to correct the color unevenness which is dependent on the respective halftone screening conditions.

14. The image processing method according to claim 13, wherein the stored correction amount corresponds to a density of an image.

15. The image processing method according to claim 13, wherein the stored correction amount comprises a density correction table including common information and a condition dependent table including dependent information used to correct color unevenness which is dependent on the respective halftone screening conditions.

16. An image processing apparatus comprising:

a storage unit that stores a correction amount used to correct color unevenness of an image; and a correction unit that corrects an input image according to the correction amounts stored in the storage unit;

wherein the correction amount comprises a density correction amount which is common among a plurality of halftone screening conditions, the density correction amount corresponding to positions in a main scanning direction, and a density correction amount which is not common among the plurality of the halftone screening conditions.

* * * * *